(12) United States Patent
Felice et al.

(10) Patent No.: US 11,468,391 B2
(45) Date of Patent: *Oct. 11, 2022

(54) CAMERA AND SYSTEMS FOR INTEGRATED, SECURE, AND VERIFIABLE HOME SERVICES

(71) Applicant: P3 Ventures, LLC, Modesto, CA (US)

(72) Inventors: Phillip Felice, Denver, CO (US); Alfred M. Pirrone, Modesto, CO (US); Chase C. Penman, Vista, CA (US)

(73) Assignee: P3 Ventures, LLC, Modesto, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/113,159

(22) Filed: Dec. 7, 2020

(65) Prior Publication Data

US 2021/0090016 A1    Mar. 25, 2021

Related U.S. Application Data

(63) Continuation of application No. 16/041,819, filed on Jul. 22, 2018, now Pat. No. 10,860,970.

(Continued)

(51) Int. Cl.
*G06Q 10/08* (2012.01)
*H04N 7/18* (2006.01)
(Continued)

(52) U.S. Cl.
CPC ..... *G06Q 10/0832* (2013.01); *G06Q 10/0833* (2013.01); *G07C 9/257* (2020.01); *H04N 7/185* (2013.01); *G07C 9/26* (2020.01)

(58) Field of Classification Search
CPC .................. G06Q 10/0833; G06Q 10/0832
(Continued)

(56) References Cited

U.S. PATENT DOCUMENTS 6,404,337 B1   6/2002  Van Till
7,385,499 B2   6/2008  Horton
(Continued)

FOREIGN PATENT DOCUMENTS

EP    1410346 B1 *  9/2006  ......... G07C 9/00015
JP    3158522        4/2010
(Continued)

OTHER PUBLICATIONS

Dean, James. With this ring: Smart video doorbells could help amazon deliver. Mar. 1, 2018. The Times. (Year: 2018).*

(Continued)

*Primary Examiner* — Omar Zeroual
*Assistant Examiner* — Hunter A Molnar
(74) *Attorney, Agent, or Firm* — Critical Path IP Law, LLC

(57) ABSTRACT

Systems and methods for providing integrated, secure, and verifiable home services, such as delivery of physical items within a home and execution of services within a home, are disclosed. In certain embodiments, the system includes cameras, sensors and locks wirelessly connected and configured to provide information to a server associated with the delivery of items and services. In one embodiment, the disclosed methods track and deliver a package in a secure and verifiable manner through use of a time-limited electronic key. Other embodiments include apparatuses having wirelessly connected cameras that allow monitoring of the status of the delivery of an item or of services.

20 Claims, 6 Drawing Sheets

Related U.S. Application Data

(60) Provisional application No. 62/641,803, filed on Mar. 12, 2018.

(51) Int. Cl.
*G07C 9/25* (2020.01)
*G07C 9/26* (2020.01)

(58) Field of Classification Search
USPC .......................................................... 705/332
See application file for complete search history.

(56) References Cited

U.S. PATENT DOCUMENTS

| | | | |
|---|---|---|---|
| 9,508,239 | B1 | 11/2016 | Harrison |
| 9,626,814 | B2 | 4/2017 | Eyrin |
| 9,691,199 | B1 | 6/2017 | Rapp |
| 2004/0022422 | A1* | 2/2004 | Yamauchi .............. G06Q 10/08 379/142.05 |
| 2004/0260661 | A1 | 12/2004 | Lytle |
| 2008/0165637 | A1 | 7/2008 | Hwang et al. |
| 2015/0120015 | A1 | 4/2015 | Fadell |
| 2015/0120598 | A1 | 4/2015 | Fadell |
| 2015/0178669 | A1 | 6/2015 | Carr |
| 2015/0310381 | A1 | 10/2015 | Lyman |
| 2016/0105644 | A1 | 4/2016 | Smith |
| 2016/0114976 | A1 | 4/2016 | Gupta |
| 2016/0125357 | A1* | 5/2016 | Hall ........................ H04W 4/80 705/337 |
| 2016/0171435 | A1 | 6/2016 | Newton |
| 2016/0180667 | A1 | 6/2016 | Bunker |
| 2017/0103628 | A1 | 4/2017 | Lampert |
| 2017/0236193 | A1 | 8/2017 | Vivint |
| 2017/0301200 | A1 | 10/2017 | Siminoff |
| 2017/0330145 | A1* | 11/2017 | Studnicka .......... G07C 9/00896 |
| 2018/0070753 | A1 | 3/2018 | Eveloff |
| 2018/0075681 | A1* | 3/2018 | Scalisi ................... H04N 7/188 |
| 2018/0130017 | A1* | 5/2018 | Gupte .................... G01N 33/00 |
| 2018/0285653 | A1* | 10/2018 | Li ....................... G06Q 10/0833 |
| 2019/0160994 | A1* | 5/2019 | Letson ................. F25D 29/003 |

FOREIGN PATENT DOCUMENTS

| | | |
|---|---|---|
| WO | WIPO2009/094591 | 7/2009 |
| WO | WO2012030077 | 8/2012 |
| WO | WO2016093542 | 6/2016 |

OTHER PUBLICATIONS

Springer, Jo. Walmart testing "direct-to-fridge" delivery. Sep. 23, 2017. Supermarket News. (Year: 2017).*

* cited by examiner

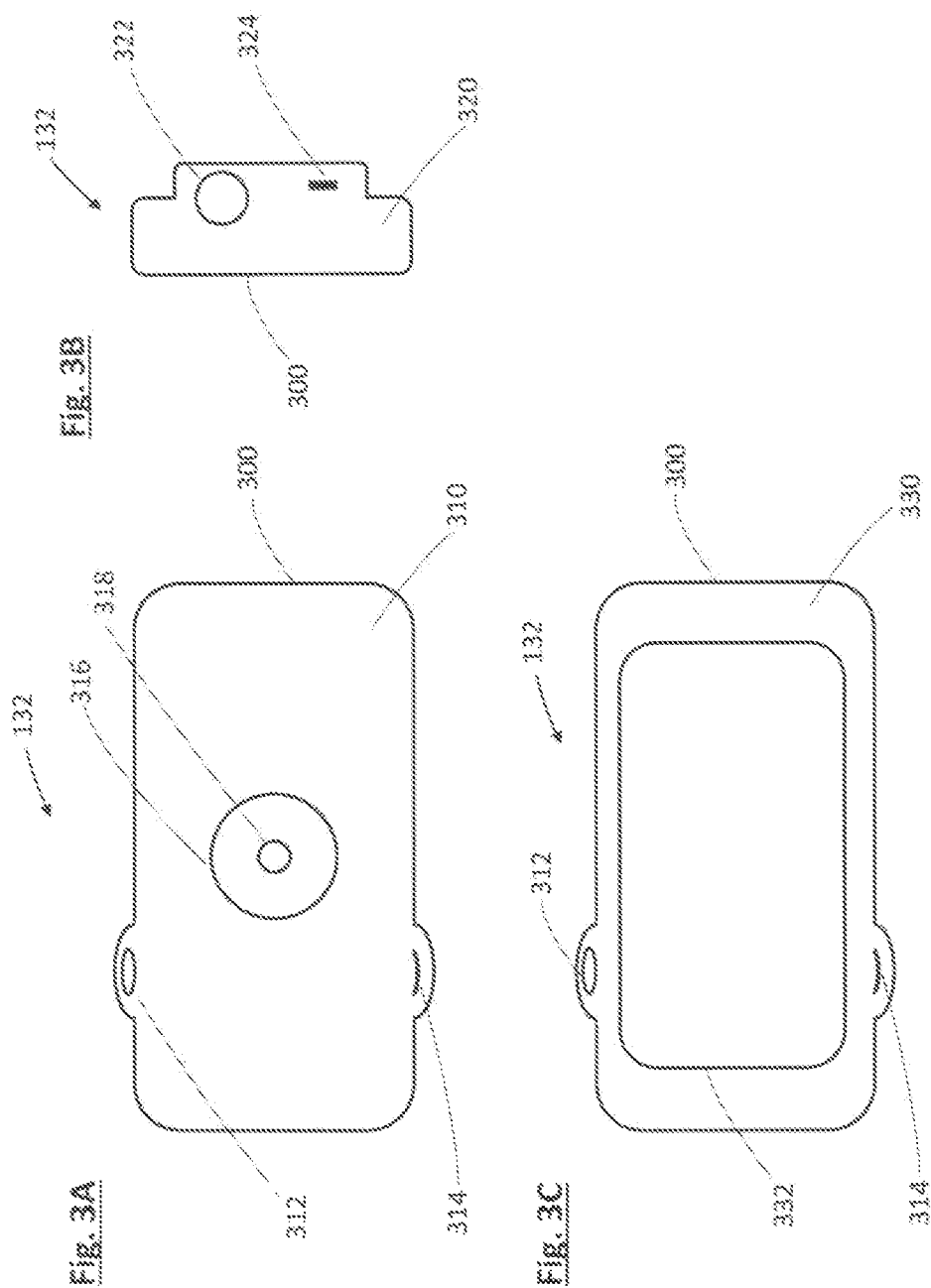

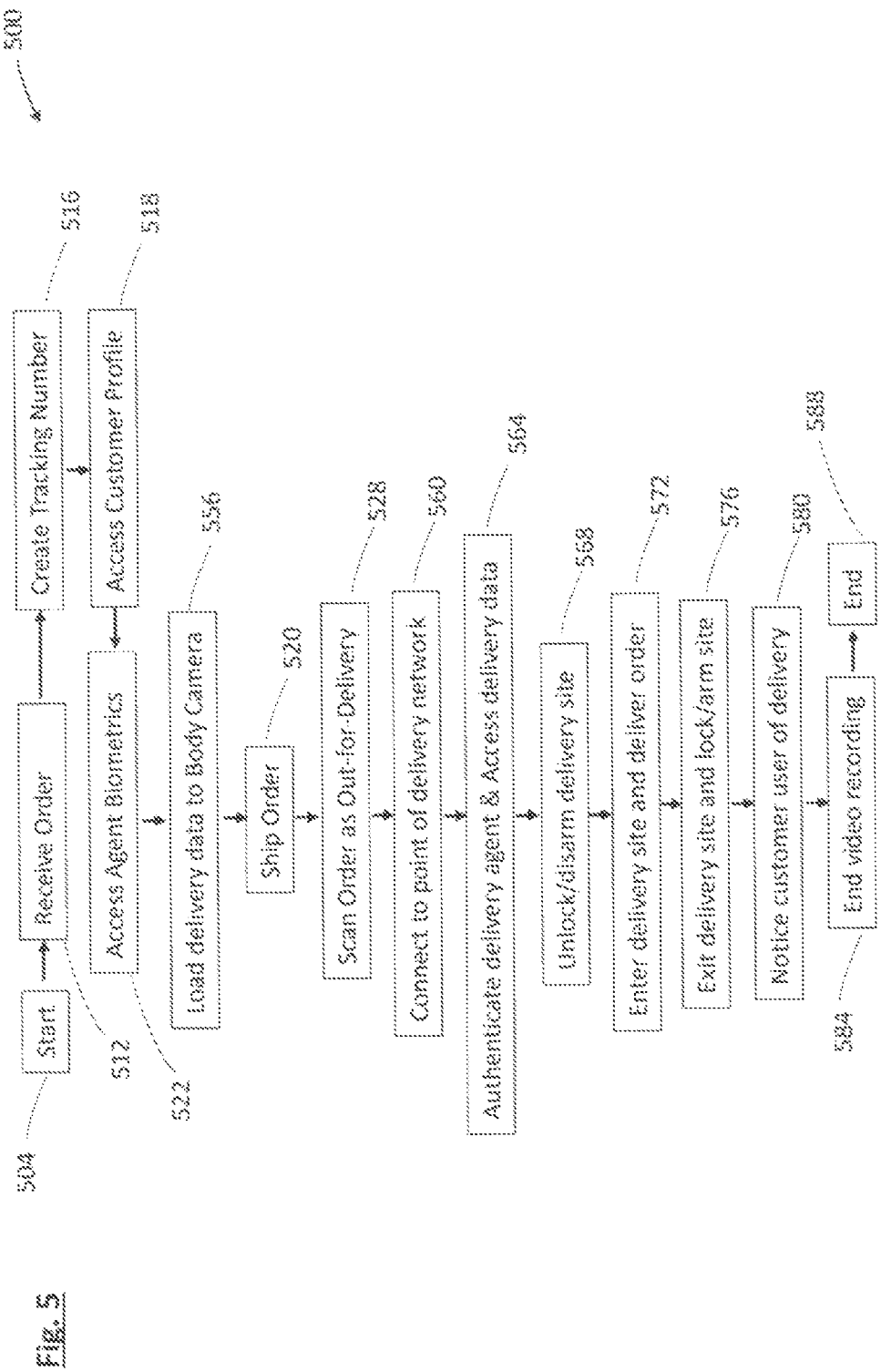

CAMERA AND SYSTEMS FOR INTEGRATED, SECURE, AND VERIFIABLE HOME SERVICES

CROSS-REFERENCE TO RELATED APPLICATIONS

This application is a continuation of U.S. patent application Ser. No. 16/041,819, filed Jul. 22, 2018 and titled "Camera and Systems for Integrated, Secure, and Verifiable Home Services," which in turn claims the benefit of U.S. Provisional Patent Application No. 62/641,803, filed Mar. 12, 2018 and titled "Camera and Systems for Integrated, Secure, and Verifiable Home Services," the disclosures of which are hereby incorporated herein by reference in entirety.

FIELD

The present invention is directed to a camera, systems, and methods to provide integrated, secure, and verifiable home services, such as delivery of physical items within a home and execution of services within a home.

BACKGROUND

Traditionally, when customers or consumers request delivery of services or goods, they frequently are unable to physically be at the location where the goods or services are to be delivered. Routinely, delivery windows are provided that may span multiple hours, which can be prohibitive for people to wait at the location for the goods or services to be delivered. A traditional option for the delivery of goods is for the items to be left outside of the premises. However, leaving items outside risks loss, vandalism, or theft of the item, particularly if the item is in plain view.

Another traditional option is to hide a physical key exterior to the delivery location and inform the delivery person where the key is hidden. Such an approach, however, creates potential security risks of others finding the hidden key or the delivery person keeping the key. Another typical option is to provide a delivery person a code to a keypad or garage door. This too creates potential security risks of unauthorized use or dissemination of the code.

Other options allow providing a "digital key", mobile credential or token for a temporary time to the person delivering an item to allow the item to enter the premises. The mobile credential can be issued to a service provider or delivery person's mobile device. The mobile credential interacts with a lock wirelessly, such as through WiFi, near field communication (NFC), radio frequency (RF), Bluetooth or similar technologies to verify the mobile credential. The lock then unlocks once properly authenticated. The mobile credential can be set to expire at a certain time. In these systems, however, once a delivery person is allowed entrance into the premises, there is no way to monitor the person without a separate security system in place. Furthermore, a bad actor who obtains the digital key from the authorized delivery person may enter the home given a lack of in-situ or on-site verification of the authorized delivery person.

Other options allow remote unlocking of the premises through a web-based interface or through a mobile phone application. However, such a system unnecessarily burdens the home owner or delivery company, in that, for example, active engagement must occur with the delivery agent during a narrow delivery window, typically with little or no advance warning.

Certain systems and methods of delivery require a camera to be consistently on and pointed to an area of the house. However, such systems are only focused on a specific area. Thus, if a person is outside the specific area where the camera is pointed, the person can escape detection. Once outside the limited monitoring area, a person already inside the house can do as they wish undetected.

Other systems, such as those disclosed by U.S. Patent Publication No. 2017/0103628 to Lampert et al., incorporated by reference in its entirety, describe delivery of services in a way that allow the actions of service providers to be monitored. Lampert discloses using a camera monitored by the service provider and then displayed to the consumer. However, the service provider has complete control over this system and can potentially be circumvented by the delivery person who has the knowledge and control of the systems.

What is needed is a system and method to provide integrated, secure, and verifiable home services, such as integrated delivery of physical items within a home and execution of services within a home, the deliveries and services provided by an authenticated agent in a secure manner. Furthermore, what is needed is a system having cameras, sensors and locks that are wirelessly connected that can provide information to a server regarding delivery of items and services and provide verifiable execution. Additionally, what is needed are methods of tracking and delivering a package in a secure and verifiable manner that requires little to no active participation by the delivery company or homeowner. Also, what is needed are apparatuses including wirelessly connected cameras that allow monitoring the status of the delivery of an item or of services. This disclosure solves the limitations of existing systems and provides the above beneficial features.

SUMMARY

The present disclosure can provide several advantages depending on the particular aspect, embodiment, and/or configuration.

The disclosure involves systems and methods to provide integrated, secure, and verifiable home services, such as delivery of physical items within a home and execution of services within a home.

An advantage of the disclosed system and method over what currently exists is that it creates the video record of the delivery and associated in home presence. Thus, home delivery can be provided in a secure way by monitoring the presence of service providers in the home, traced back through the tracking number of the original order. This creates the possibility to dispute unacceptable work for the customer via their video recording, and also prevents false claims from affecting the carriers. This opens up additional revenue generating opportunity through the sale of value added services like groceries being put away or wall mounted electronics installed without the home owner being present.

In certain embodiments, a customer has an online store profile. The online store profile includes the customer's security information. The information can include information about the customer's locking mechanism, such as the brand of lock, its serial number or customer given name, whether the lock can be accessed through a mobile credential, i.e. a "smart lock", whether the lock can be unlocked remotely, any alarms, and any security services. The customer approves service on the online profile with the lock supplier and alarm supplier as applicable. The online profile can also include information for login credentials for the home WiFi network. The customer can place an order for goods or services online. A tracking number or work order number is created. The tracking number or work order number is provided by the appropriate delivery or service provider. The number may also be provided to the vendor, lock company, and/or alarm company. When the goods or services are to be delivered, the tracking number or work order number is scanned indicating that the item or the services are out for delivery. Once an out for delivery scan is indicated, a predetermined time window, e.g. a carrier's standard delivery hours for the given route, can be created for an unlock protocol. An unlock protocol can be associated with tracking numbers synchronized with the customer's profile and can include notification to the lock company to unlock the locking mechanism once a delivery scan occurs at the locking mechanism.

In certain embodiments, a delivery person or service provider wears a camera, such as a body camera. As referenced herein, a "delivery person" or "delivery agent" includes a person who delivers goods, such as packages or tangible items, or services such as repair or maintenance services, or both. Each body camera is either assigned to a specific delivery person or is able to access a database of delivery agent profiles. The body camera includes wireless communication, such as WiFi, Bluetooth, NFC, or any other wireless communication technologies. The body camera also includes GPS technologies. Other embodiments include more than one body camera. In some embodiments, a delivery person or delivery agent may be an automated delivery machine, such as an automated drone traveling by air or an automated vehicle traveling on the ground or any machine capable of substantially performing the duties of a human delivery person.

In one embodiment, a method to provide secure delivery of at least one item to a delivery point is disclosed, the method comprising: receiving an order from a customer user to deliver at least one item to a delivery point, the delivery point comprising a lock-alarm system that operates in at least an activated mode and a deactivated mode; accessing a user profile comprising delivery point network access data and delivery point lock-alarm data, each of the delivery point network access data and delivery point lock-alarm data associated with the delivery point; transmitting the delivery point network access data and delivery point lock-alarm data to a wireless device associated with a delivery agent; positioning the delivery agent proximal to the delivery point; connecting the wireless device to a communication network of the point of delivery using the delivery point network access data; changing the lock-alarm system from the activated mode to the deactivated mode using the delivery point lock-alarm data; activating a timer or a video recording function of the wireless device; and delivering the at least one item to the delivery point.

In one aspect, the method further comprises the step of verifying the identity of the delivery agent prior to the step of changing the lock-alarm system from the activated mode to the deactivated mode. In one aspect, the step of verifying the identity of the delivery agent comprises verifying biometric data associated with the agent. In one aspect, the step of verifying the biometric data comprises interaction of the delivery agent with a biometric sensor disposed on the wireless device. In one aspect, the wireless device comprises a camera. In one aspect, the video recording is automatically activated upon connecting the wireless device to the communication network of the point of delivery. In one aspect, the communication network is a wireless communication network. In one aspect, the method further comprises the step of broadcasting the video recording to the customer user.

In another embodiment, a system to provide secure delivery of a good to a delivery point is disclosed, the system comprising: a database of customer user data, the customer user data comprising delivery point network access data and delivery point lock-alarm data, each of the delivery point network access data and delivery point lock-alarm data associated with the delivery point; a customer order receiver configured to receive a customer order, generate or retrieve a tracking number associated with the customer order, and to access the delivery point network access data and delivery point lock-alarm data; a wireless device associated with a delivery agent and configured to receive the tracking number, the delivery point network access data, and the delivery point lock-alarm data, and further configured to communicate with a communication network of the delivery point; wherein: upon verification of the identity of the delivery agent, a lock-alarm system disposed at the delivery point switches from an activated mode to a deactivated mode, the wireless device activates a video recording or a timer function, and the good is delivered to the delivery point.

In one aspect, the wireless device is attachable to the delivery agent. In one aspect, the wireless device comprises a biometric sensor configured to verify the identity of the delivery agent. In one aspect, the wireless device is configured to broadcast the video recording to an entity that delivers the customer order. In one aspect, a validity of the delivery point network access data and the delivery point lock-alarm data are time-limited. In one aspect, the delivery point is one of a residence and a business. In one aspect, the biometric sensor is a fingerprint sensor.

In yet another embodiment, a method to provide secure and verifiable delivery of at least one service or at least one item to a home is disclosed, the method comprising: receiving an order from a customer user to deliver at least one service or at least one item to a home; creating a user profile comprising home network access data associated with a home network; generating a lock-alarm token to allow access to the home, the home comprising a lock-alarm system that may operate in an activated mode and a deactivated mode; combining the network access data with the lock-alarm token to create a data packet; transmitting the data packet to a camera of a delivery agent; connecting the camera to the home network; providing the lock-alarm token to a lock-alarm receiver to change the lock-alarm system from activated mode to deactivated mode; activating a video recording or a timer function of the camera; and delivering the at least one service and the at least one item to the home.

In one aspect, the method further comprises the step of authenticating an identification of the delivery agent. In one aspect, the step of authenticating the identity of the delivery agent comprises use of a biometric sensor. In one aspect, the method further comprises the step of broadcasting video recording data to the customer user. In one aspect, the lock-alarm token is temporally-limited.

The phrase "home services" means any service provided to a home, to include delivery of items such as packages, groceries, etc. to the inside of a home, and execution of services within a home, such as house-cleaning, installation of goods or repair/maintenance of home devices, and execution of services on the property of a home, such as exercising of pets in a yard of a home.

At the premises where the goods or services are to be delivered, the delivery person scans the package or work order. In one embodiment, the package or work order may be scanned as a feature or capability of a body camera system worn by the delivery agent. Once the scan occurs, a notice of the delivery attempt is sent wirelessly to the lock company and if applicable the alarm company. When the notice of delivery attempt is received by the lock company and alarm company, the system determines that the body camera worn by the delivery person is within the vicinity of the smart lock by the body camera being connected to the customer's WiFi network and connection to the lock. The determination can be based on a predetermined distance, such as a "geofence". In certain embodiments, the determination that the delivery person is in the vicinity can be a direct connection between the body camera and the smart lock. Once receiving a notification, the body camera is in the vicinity an unlock code is sent from the lock company and if applicable, a disarm code is sent by the alarm company. The unlock code also triggers the body camera to begin recording.

While the delivery person is in the vicinity or connected to the smart lock or the WiFi network of the premises where the delivery is occurring, the door remains unlocked. The body camera transmits the video from the body camera. The video data can be transmitted from the WiFi network of the premises or via a wireless connection from the camera. In one embodiment, the video can be transmitted real time in the same way a WiFi security system works, with the added benefit that it does show connectivity as a security measure depicting proximity and time in zone; furthermore, a disconnection may serve as a means to force the lock/arm protocol when checked against proximity. Once the delivery is complete, a wireless communication, such as NFC, WiFi or Bluetooth communication from the camera of the delivery person with the smart lock signals that the delivery is complete, which locks and arms the security system and may signal to the delivery company that the delivery is complete. In certain embodiments, once the delivery is complete, a notification is sent to the lock company and if applicable, the alarm company. Once the notification is received, the locking mechanism will lock, and the alarm will be armed after a predetermined amount of time. In other embodiments, the camera includes a mechanism that can activate the locking mechanism to lock and arm the alarm.

Certain embodiments include taking a picture of the delivered package by the camera. The picture of the delivered package can be saved locally or sent to interested parties after the picture is taken.

The streamed or uploaded video may be stored in any of several locations, to include, e.g., vendor, lock company, system server, the camera itself, a wireless device used by a delivery agent, and a cloud server. In one embodiment the video may pass through while connected to the customer's WiFi and go to the carrier's server. The carrier could then make it available to the vendor. In this manner, the customer can watch home delivery/install in real time from the vendor or carrier's server.

Embodiments of the present invention include a camera and a docking station. The camera includes wireless communication protocols and technologies including WiFi, LTE, Bluetooth, NFC, GPS, Infrared (IR), Zigbee, and the like. The camera includes firmware able to match photo and video with a tracking number. The camera can connect securely to the smart lock, alarm and carrier systems. The camera includes firmware to operate as a WiFi camera to send video and/or photo to an offsite server of the carrier in real time or soon after the video and or photo are captured. Certain embodiments include a camera having local storage.

In certain embodiments, a docking station is configured to connect external memory storage, such as external storage connectable through a USB port or secure digital (SD) memory card. The docking station includes firmware that can match photo and/or video with the tracking number and wirelessly transmit the information to the smart lock, alarm, and carrier systems. In certain embodiments, the docking station charges the camera, can store locally removed video content from the camera to free up space. The docking system can also upload all the video footage using LTE while on the road or the carriers WiFi back at the delivery hub.

Embodiments of the present invention include a camera that can wirelessly communicate with the service provider's server to confirm or verify the purchase or work order and provides direct connection to the consumer. In certain embodiments, the service provider's network connects to third-party application which serves as an interface between the service provider, the consumer and the camera. The consumer can access the camera data (i.e. video or photo) via the application, which can be installed on a mobile device, such as a smartphone, tablet, or personal computer. The application can remotely connect to the server, so the consumer can view the camera feed in real time. The camera can also be configured by the consumer through the application to take pictures at predetermined intervals. The camera can adjust its resolution based on speed of internet connection. The camera data can also be configured to be stored by the consumer on their local home network through a wireless connection or stored by the network hosting the application or on a cloud server. In certain embodiments, the consumer can access the camera data through a web-based platform.

Embodiments of the present invention include a camera having authentication to ensure the camera is worn by the delivery person. To ensure the camera is being worn by an assigned person, certain embodiments include a biometric authentication component, including a fingerprint reader, facial recognition, voice recognition, DNA scanning, heart rate monitor, or any other means that can identify that the assigned person is the person is the one wearing the camera. The authentication component can be activated anywhere in the process. If the camera is deactivated or removed from the delivery driver before delivery has been confirmed, a notification is sent to indicate the camera has been removed.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention, nor its uses. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the exemplary claims provided herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that can perform the functionality associated with that element.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 3A is a front view of one embodiment of a camera of a system to provide integrated, secure, and verifiable home services;

FIG. 3B is a right-side view of the camera of FIG. 3A;

FIG. 3C is a rear view of the camera of FIG. 3A;

FIG. 5 is a flowchart depicting another embodiment of a method to provide integrated, secure, and verifiable home services.

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

The following disclosure generally relates to systems and methods to provide integrated, secure, and verifiable home services, such as delivery of physical items within a home and execution of services within a home.

Additional details of the invention are provided in the attached figures and/or tables.

Figure 1:
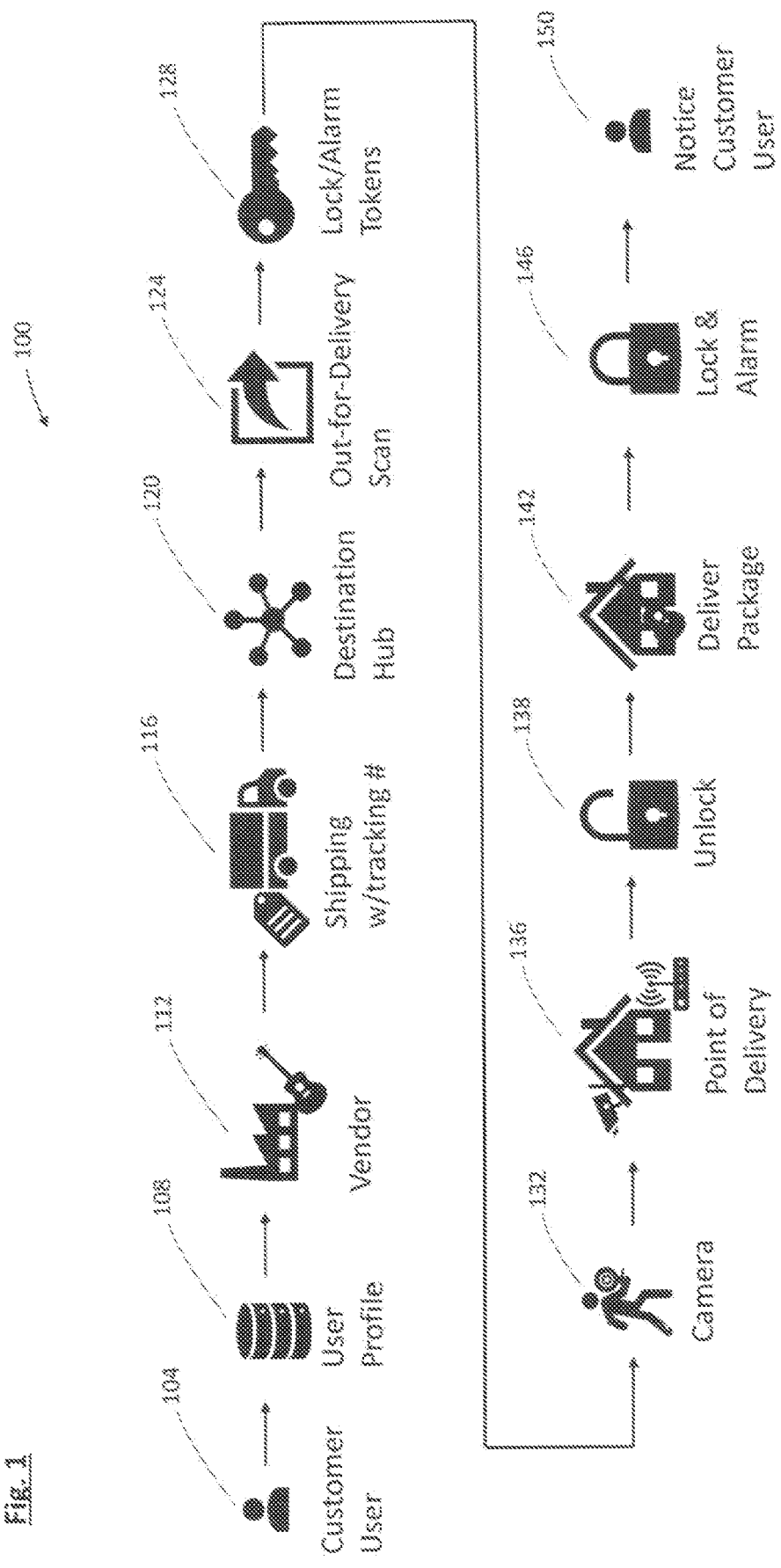
FIG. 1 is a schematic diagram of one embodiment of a system to provide integrated, secure, and verifiable home services.

With attention to FIG. 1, a schematic diagram of one embodiment of a system 100 to provide integrated, secure, and verifiable home services is provided. Generally, the system 100 includes a customer user 104, who selects one or more service offerings available from a vendor 112 or other service provider. The services may include delivery of packages or items, such as groceries, event tickets, consumer goods, etc., and services to be performed within or adjacent the home property, such as installation of home items (e.g. mount a television, swap-in an upgraded router), repair of home items (e.g. repair a faulty dishwasher) and exercise a pet in a backyard. The services provided within the customer user home and/or on or adjacent the customer user home may be referred to as "home concierge" services. The customer user 104 provides, either in advance or as part of each transaction, a user profile 108 to a server. In one embodiment, the customer user 104 is an authorized agent of the customer user 104, such as an adult daughter acting on behalf of an elderly parent who owns or lives in the home acting as the point of delivery 136. The phrase "point of delivery" is broadly defined as any location that may be identified by a user, to include, as non-limiting examples, physical structures such as a home, residence to include an apartment, and businesses; moveable entities with a designated secure area, such as a trunk of a car or cargo hold of an aircraft, and designated meeting locations where an authorized party may receive a delivery, such as a security professional waiting for a delivery outside of a school of a user's child or an assistant waiting for a delivery outside of a business.

The user profile 108 may include specific data to enable the vendor's agent (e.g. a delivery person) to securely enter the customer user's 104 home or point of delivery 136. For example, the user profile 108 data may include WiFi passwords or protocols for entry to the point of delivery 136. The user profile 108 data may also include user preferences for particular services requested, such as, for example, the manner or specifications for mounting a television (the location for the mounting, the height of the mounting, e.g.), details of exercising a pet (e.g. give Lucy a treat but no treats for Smokey given stomach issue), or identification of water shut off valve as needed for dishwasher repair. The user profile 108 data may include order details, such as items or services for delivery, and any special handling required for the order (e.g. a perishable food item may require placement in a refrigerator at the point of delivery). In one embodiment, the user may indicate (in the user profile 108) that before any entry to a designated point of delivery (e.g. the user's home), a final notice to and/or authorization from the user is required for entry of the delivery agent to the home. Upon the customer giving this authorization, an unlock token is transmitted and the door unlocks allowing entry to the home.

The user profile 108 data may be physically stored in any number of locations, to include vendor's site, delivery agent's site, and cloud-based site(s). The user profile 108 may capture preferences that are associated with multiple parties associated with a particular point of delivery 136 (note: in this disclosure, the phrases "point of delivery" and "delivery point" are interchangeable). For example, the user profile might provide that for a first customer user 104, packages are to only be delivered to a designated area in the home's foyer, and for a second customer user 104', user packages are to be delivered to a designated home office. The user profile 108 may indicate the delivery type, e.g. services to be provided or items to be delivered, and may indicate characteristics of delivery items, e.g. a consumer item vs. groceries. The user profile 108 may be associated with one customer user 104 but with multiple homes or points of delivery 136. For example, data may be contained in the user profile 108 that provides a first set of data (e.g. a first WiFi password or first protocol for entry to a first point of delivery 136, such as the primary residence of a customer user 104) and a second set of data (e.g. a second WiFi password or second protocol for entry to a second point of delivery 136', such as a mountain fishing cabin). In some embodiments, the user profile 108 is a combination of the above, e.g. multiple user profiles and multiple points of delivery. In some embodiments, the user profile 108 data may include lock identification data, such as a serial number associated with a lock located at the point of delivery.

The vendor 112 may be a provider of items or goods, services such as "home concierge" services, or both. The vendor 112 may be multiple vendors operating independently or in concert. For example, the first vendor 112 may be an online retailer that provides delivery service for only musical instruments, e.g. guitars, but is affiliated with a service provider second vendor 112' that provides in-home tuning of pianos. In such a scenario, a customer user 104 may interact with or engage with the first vendor 112 of the musical instruments to order delivery of a guitar, and request tuning of a piano at the home (the point of delivery 136) which is handled by an affiliated vendor 112' to the first vendor 112.

Upon placement of an order with a vendor 112 by a customer user 104 for delivery of items and/or execution of services at a point of delivery 136, a tracking number and/or work order number is generated, and the any items ordered for delivery are shipped, as shown in FIG. 1 as element 116. The tracking number(s) and/or work order number(s) may be shared with any of several parties associated with the system 100, to include the customer user 104, the vendor 112 and/or vendor affiliates 112', and shipping carrier associated with element 116. The tracking number(s) and/or work order number(s) may be stored on one or more servers associated with the parties associated with the system 100, to include servers of or associated with (to include cloud-based servers) the customer user 104, the user profile 108, the vendor 112 and/or vendor affiliates 112', and shipping carrier associated with element 116. In one embodiment, the tracking number(s) and/or work order number(s) are combined into one number. Here, a "number" as used with "shipping number" or "tracking number" may be any means to identify the item or services as known to those skilled in the art, to include alphanumeric numbering and RFID tagging.

At element 120 of system 100, any items ordered by customer user 104 from vendor 112 arrive at vendor hub 120 facility to prepare for local delivery. Like the notification described above with respect to element 116, the parties associated with the system 100 may be provided notice that the item has arrived at the destination hub 120, and such notice may be stored on associated servers (to include cloud-based servers) of those parties. Stated another way, the customer user 104, the vendor 112 and/or vendor affiliates 112', and shipping carrier associated with element 116 may be noticed of the arrival of the item(s) for delivery to the destination hub 120. In some embodiments, items may arrive in batches at more than one destination hub 120 or may arrive in batches to the same destination hub 120. Also, any services ordered by the customer user 104 that generate an order number may also generate a similar noticing that the order number has now arrived at the destination hub 120, and such notice may be stored on associated servers (to include cloud-based servers).

At element 124 of system 100, any items ordered by customer user 104 from vendor 112 depart the destination hub 120 for delivery to point of delivery 136, and any services ordered by customer user 104 from vendor 112 depart the destination hub 120 for execution at the point of delivery 136. Like the notification described above with respect to elements 116 and 120, the parties associated with the system 100 are provided notice that the item is now out for delivery, and such notice may be stored on associated servers of those parties. Stated another way, the customer user 104, the vendor 112 and/or vendor affiliates 112', and shipping carrier associated with element 116 may be noticed that the item(s) for delivery are now out for delivery to the point of delivery 136. Also, any services ordered by the customer user 104 that generate an order number may also generate a similar noticing that the service is to now out for execution.

At element 124, a delivery scan is made of the items(s) ordered by customer user 104 and any services ordered. The delivery scan may be performed in any manner known to those skilled in the art, to include RF scanning. Upon scanning the items at element 124 of system 100, e.g. scanning of a shipping tag affixed to the item or scanning of an order number of a service, a lock-alarm token is generated or obtained. In some embodiments, the delivery scan of element 124 is performed at the delivery location (see, e.g. FIG. 5 and associated description below.)

The lock-alarm token may be generated or obtained in any of several ways at element 128 of system 100.

A lock-alarm token (a.k.a. a lock/unlock token) is a data set that enables remote access or control of a lock, such as a lock at a point of delivery. The lock/unlock token may be created or generated by any of several parties, such as a lock manufacturer, security provider (e.g. a home security company), or any entity authorized and capable of creating a data set that may operate to control a lock at a point of delivery.

In one embodiment, upon the act of performing a delivery scan, the lock and/or alarm company associated with the point of delivery 136 and/or the customer user 104 is noticed of an intended arrival at the point of delivery 136 to deliver an item and/or perform a service, and a lock-alarm token is generated. The lock-alarm token will enable a specific delivery person to deliver the item and/or perform a service within and/or adjacent to the home and/or adjacent to the home property at the point of delivery 136. The lock-alarm token may be temporally-limited, meaning that the lock-alarm token may only be valid for a specified time frame. Note that "home property" means the real property associated with a physical home, such as the physical land surrounding a physical home. Note that the phrase "adjacent to the home property" or "adjacent to the home" means the immediate area in and around the home property. For example, in one embodiment, the immediate area in and around the home property means the area of WiFi service of the point of delivery 136. In another embodiment, upon the act of performing a delivery scan, the user profile 108 is assessed and a lock-alarm token is obtained.

The characteristics (e.g. timing, triggers) for transmittal of the lock-alarm token data may occur in any of several ways. For example, the lock-alarm token data may be transmitted to the camera prior to the out-for-delivery scan 124 (the phrase "out-for-delivery scan" and "delivery scan" are equivalent) or simultaneously with the delivery scan 124. In another example, the lock-alarm token data may be transmitted upon arrival of the agent to the delivery point 136. Furthermore, the lock-alarm token data may be transmitted upon positive connection of the camera 132 with the WiFi at the point of delivery 136. In another example, the lock-alarm token data may be transmitted upon positive verification of a biometric of the agent, such as a fingerprint verification via the camera 132.

In one embodiment, both user profile 108 and the lock-alarm company are noticed of the delivery scan and a lock/token is requested, the lock-alarm token only obtained if authentication protocols between the user profile 108 and the lock-alarm company are satisfied. For example, the use profile 108 may limit home access to weekdays between 10 am and 3 pm. If a lock-alarm token is requested on a Saturday, or for a weekday delivery between 3:30 pm and 4:30 pm, no lock-alarm token will be provided because the authentication protocol has not been satisfied. As another example, if the user profile 108 indicates that no in-home deliveries are to be made by delivery agent A, and the request is for a lock-alarm token is being made for delivery by agent A, the no lock-alarm token will be provided because the authentication protocol has not been satisfied.

The lock-alarm token(s) of element 128 of system 100 may be combined into a data packet with any combination of data associated with the system 100, to include tracking numbers, billing numbers, customer user 104 data stored in the user profile 108 (such as point of delivery 136 WiFi data, e.g. WiFi network name and password). The formation of such data packet(s) may occur in any of several locations, to include servers associated with the shipping carrier, the vendor, and the customer.

The lock-alarm tokens generated at 128 are provided to a camera 132 of a delivery agent. The camera 132 is configured to enable the delivery agent to efficiently, reliably, and securely enter the point of delivery 136 and delivery one or more items within the home and/or perform one or more services within the home or home property or adjacent the home property. The camera is worn or otherwise engaged with the delivery agent such that, upon passing a threshold distance from the point of delivery, the WiFi network at the point of delivery (e.g. a home) is engaged. Here, "WiFi" means any wireless communication network that provides transmit and receive communications not connected by an electrical conductor, to include high frequency radio signals and any other mode of wireless transmission, such as infrared.

The WiFi engagement between the camera 132 and point of delivery 136 may involve authentication protocols or processes, to ensure, for example, the camera is being used or worn by an authorized delivery agent and not, for example, by a bad actor. Furthermore, the camera 132 may be configured to verify that the party wearing or engaged with the camera is an authorized delivery agent. For example, the camera 132 may be configured with one or more biometric sensors that sense one or more biometric characteristics of the delivery agent to verify the identity of the delivery agent. More specifically, a biometric sensor of the camera may include a component that fits to a finger of the delivery agent to obtain a fingerprint that may be used to authenticate the delivery agent. In the case that the delivery agent is an automated vehicle (e.g. a drone or a ground-based rover), the camera may be fitted to the automated vehicle and perform periodic authentication pings to the automated vehicle to ensure it is an authorized delivery agent.

The camera 132 may comprise a processor, a router, one or more biometric sensors (e.g. voice, retina, fingerprint, facial recognition), an RFID transceiver, a user viewer screen, internal memory storage, WiFi/NFC/Bluetooth capabilities, touch screen capable of receiving user finger signature and/or wireless stylus), and an energy source. Furthermore, the camera 132 may employ measures to prevent tampering, such as a disarming capability wherein the camera is disabled in the event of tampering (e.g. opening of any exterior surfaces of the camera) is detected. More details of one embodiment of a camera 132 is provided in FIGS. 3A-C and the associated description.

In one embodiment, the camera 132 is any wireless device, to include a camera 132 and a wireless device that comprises a camera, such as a typical smartphone. Other configurations of the camera 132 as any wireless device are possible, to include a tablet device, an RFID reader with wireless capability, etc. In one embodiment the camera 132 is a wireless device issued by the delivery service provider that is associated with a delivery agent.

The point of delivery 136 includes a lock-alarm system that may operate in an activated mode and a deactivated mode. The lock-alarm tokens 128 enable the lock-alarm system to move between the activated mode and the deactivated mode, and vice versa. Using the WiFi network of the point of delivery and after an authentication of the delivery agent is satisfied, the camera 132 transmits the lock-alarm tokens 128 to unlock an entry to the point of delivery, as depicted in element 138 of system 100. The transmittal of the lock-alarm tokens 128 may be to the lock-alarm company which transmits a signal to the point of delivery to unlock the point of entry. Alternatively, or additionally, the camera 132 may transmit the lock-alarm tokens 128, by way of the point of delivery WiFi network, to a lock-alarm system positioned at the point of delivery. For example, the camera 132 may transmit the lock-alarm tokens 128 to a local lock-alarm receiver to authenticate the delivery agent. In some embodiments, one or more other or additional verification protocols are performed to verify the authenticity of the delivery agent and increase security of the deliver and entry to the point of delivery 136. For example, a video camera mounted at the point of delivery 136 may perform a facial recognition or voice authentication of the (human) delivery agent, or a frequency analyzer similarly mounted may perform an authentication of unique acoustics of an airborne drone or other type of automated delivery agent.

Any one or more of the events associated with the approach to or actual entry of the delivery agent to the home or home property may trigger a notice to associated parties or trigger a system event. For example, the establishment of an authenticated WiFi connection between the delivery agent and the WiFi network at the point of delivery may trigger notice to the customer user, the vendor, the lock-alarm company, and/or the shipping carrier. As another example, the satisfactory authentication of the delivery agent, and/or the satisfactory exchange of lock-alarm tokens which unlocks the point of entry to the point of delivery 136, may trigger notice to associated parties and/or the start of video and/or audio recording. The notice may be provided by broadcast from the camera 132 and/or by a broadcast system located at the point of delivery, such as a home security system that has a broadcast capability. Such recordings, in one embodiment, may be transmitted, in real-time or near real-time, to one or more of the afore-mentioned associated parties. Yet another example, the actual entry into the point of delivery of the authorized delivery agent may trigger yet another authentication check between a sensor system (e.g. RF broadcast system) mounted in the home's interior and the camera; if the authentication fails, the home's alarm system may broadcast. In another example, the actual entry into the point of delivery of the authorized delivery agent may trigger a particular internet-of-things device to enable a particular service or delivery protocol (as, for example, defined in the user profile 108); a dog door may unlock to allow a pet to be let out into backyard, or a lock on an office door may unlock to enable the delivery agent to deliver an item to an otherwise locked home office. In one embodiment, the home WiFi network is a wireless mesh network. In one embodiment, a wireless mesh network disposed at the point of delivery is used to further authenticate the activities of the delivery agent. Here, a "wireless mesh network" is a wireless network comprising a plurality of radio nodes organized into a mesh topography.

In one embodiment, any of the system 100 notices or actions may use NFC between system elements or components. For example, upon entry to an exterior doorway landing of a home, the delivery agent may bring his camera very near to or touch with a receiving pad mounted on the home to trigger the exchange of the lock-alarm tokens via the home WiFi network with the lock-alarm company. Here, "NFC" means near field communication or any short-range wireless connectivity standard, to include those that utilize magnetic induction to enable wireless communication.

The sequence of steps or elements of FIG. 1 may occur differently, e.g. some steps may be omitted, some steps added, and the steps may follow in other than increasing numerical order. In one embodiment, the lock/alarm tokens 128 are provided or transmitted to the camera 132 of the agent at or after the agent arrives at the point of delivery 136. For example, the lock/alarm tokens 128 are transmitted to the camera 132 after the agent arrives at the point of delivery 136. In one embodiment, an affirmative act of the agent using the camera is required to trigger the transmittal of the lock/alarm tokens 128, such as NFC connection between the camera and the point of delivery, or the verification of the biometric data, for example. The receipt of the lock/alarm tokens 128 by the camera 132 of the agent enables the unlock 138 to occur.

At element 142 of system 100 the item(s) for delivery and/or service(s) to be performed at the point of delivery are delivered and/or executed, respectively. The acts of delivery and/or performing of a service may be recorded and/or transmitted (video and/or audio, e.g.) to one or more of the afore-mentioned associated parties. In one embodiment, a quality check signal is sent to one or more of the associated parties (e.g. to the customer user), allowing the receiving party to perform a quality check of the item delivered or the service performed. For example, the customer user may view a picture mounted on a wall by the delivery agent, to verify its location, or a customer user may engage an audio receiver to listen to a practice scale performed on a newly-tuned piano, to verify the quality of the tuning.

At element 146, the delivery agent departs the interior of the point of delivery 136 and the lock and alarm system are returned to a locked and alarmed configuration. The re-arming and/or re-locking of the point of delivery 136 may be triggered by one or more acts of the delivery agent, such as touching or close-approach of the camera 132 to a designated location at or near the point of delivery 136. Such an event may trigger the cessation of any recording being performed by the camera 132 and/or recording systems mounted at the point of delivery. The rearming and relocking of the point of delivery may be performed by the lock-alarm company upon notice by the camera, via the home WiFi network, to the lock-alarm company. In other embodiments, the camera includes a mechanism that can activate the locking mechanism to lock and arm the alarm.

At element 150, the customer user 104 may be notified or noticed that the requested delivery of item(s) and/or execution of service(s) have been completed, the delivery agent has departed the point of delivery area (e.g. is outside the range of the home WiFi network), and the lock-alarm system has been re-activated.

Note that while specific noticing actions have been described above associated with elements or steps of the system 100 to particular parties associated with the system 100, noticing of the associated parties may occur at any time in the system and at any step of the system. For example, the destination hub 120 of the shipper may be noticed when a customer user 104 orders an item, which may assist the destination in staffing or inventory management operations. Also, the noticing of the associated parties may be continuous or may occur at regular intervals (e.g. each minute) or may occur at designated event moments.

Figure 2A:
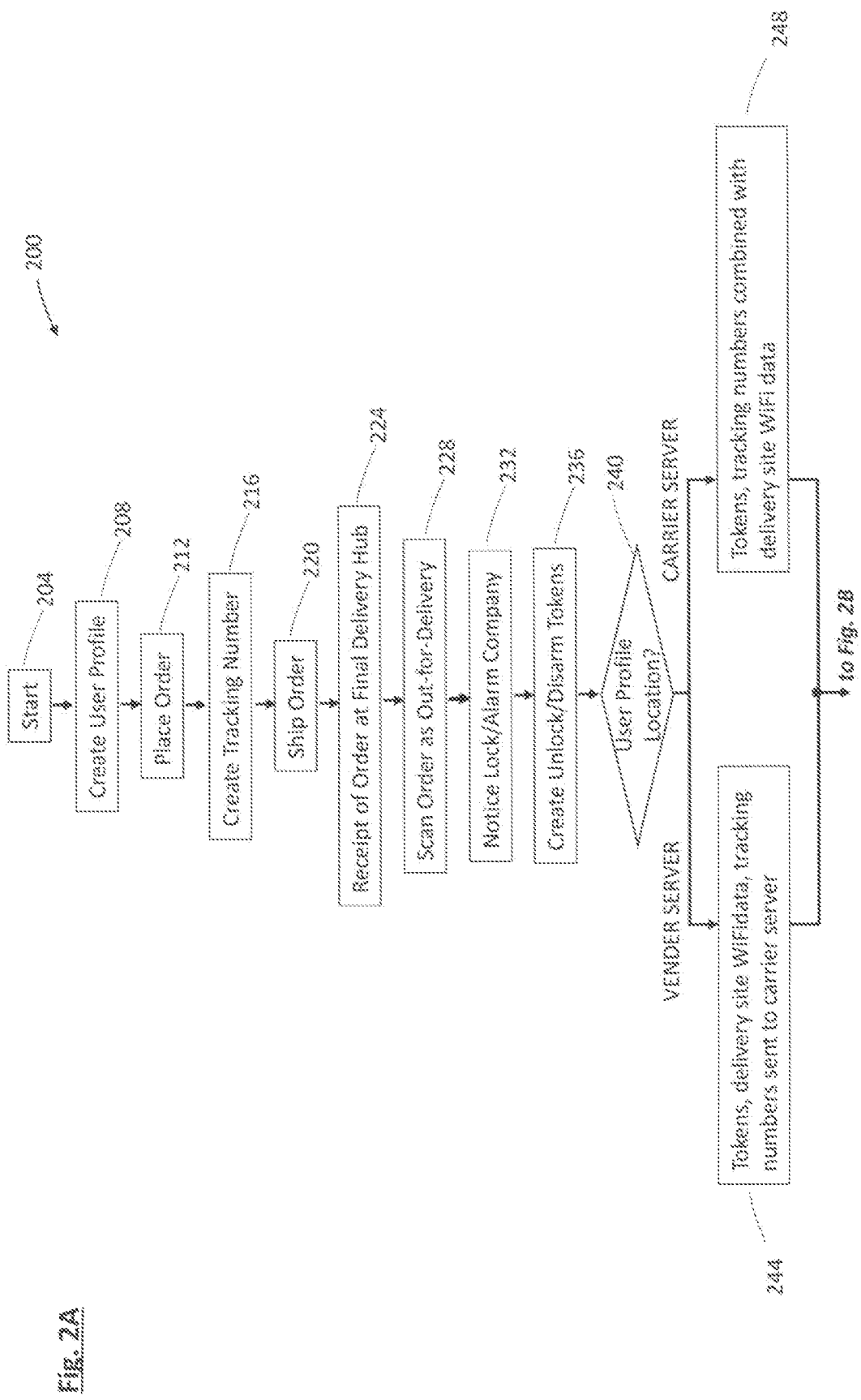
FIG. 2A is part one of two parts of a flowchart depicting one embodiment of a method to provide integrated, secure, and verifiable home services, and continues to FIG. 2B.
Figure 2B:
FIG. 2B is part two of two parts of a flowchart depicting one embodiment of a method to provide integrated, secure, and verifiable home services, and continues from FIG. 2A.

With attention to FIGS. 2A-B, a flowchart of one embodiment of a method 200 to provide integrated, secure, and verifiable home services is provided. The system 200 is like the system 100 of FIG. 1, and as such, reference will be made to FIG. 1 and to the above description of FIG. 1 to include reference to element numbers provided on FIG. 1.

The method 200 starts at step 204 and ends at step 288. Any of the steps, functions, and operations discussed herein can be performed continuously and automatically. In some embodiments, one or more of the steps of the method 200 may comprise computer control, use of computer processors, and/or some level of automation. The steps are notionally followed in increasing numerical sequence, although, in some embodiments, some steps may be omitted, some steps added, and the steps may follow other than increasing numerical order.

After starting at step 204, at step 208 a user profile 108 is created by a customer user 104 and stored on or made accessible to one or more of a vendor server and a shipping carrier server. In some embodiments, the user profile 108 may be stored on a user's own server. In some embodiments, the user profile 108 data are stored exclusively on only one of the vendor server or the carrier server, and explicitly not on both. The user profile 108 may comprise data as described above, such as user preferences for home deliveries and concierge services, and WiFi network data such as network name and access codes or passwords. After step 208, the method 200 continues to step 212, where an order with one or more vendors 112 is placed. The order is recorded on a vendor server. As discussed above, the customer order may comprise delivery of one or more physical items and/or the procurement of one or more services (i.e. concierge services) to be executed within or adjacent to the point of delivery 136.

After completion of step 212, the method 200 continues to step 216 where one or more tracking numbers (for delivery of physical items) and/or one or more billing numbers (for services to be performed) are created or generated. The tracking and/or billing numbers are generated by the shipping carrier and/or the service provider and may be recorded or stored on either or both of the shipping carrier and/or service provider server. The tracking and/or billing numbers are output or communicated with the vendor server.

After completion of step 216, the method 200 continues to step 220 where the items for delivery are shipped to a destination hub 120, aka are shipped to a final delivery hub location. The act or step of initiating the shipping of the items may trigger transmittal of the tracking and/or billing numbers to the vendor server. After completion of step 216, the method 200 continues to step 228 where the items for delivery are scanned to deem the items out for delivery. Such a designation may trigger notice to the vendor server by the carrier server that an item is now out for delivery. In some embodiments, the notice of the out for delivery status of one or more items is provided by only one of the vendor server or the carrier server, and explicitly not from both.

After completion of step 228, the method 200 continues to step 232 in which the lock-alarm companies are notified (by either the shipping carrier server or the vendor server) of the out for delivery status of one or more items. After the lock-alarm company is notified of the out for delivery status of one or more items (and thus the completion of step 232), the method 200 continues to step 236 whereby lock-alarm tokens 128 are created. The lock-alarm tokens 128 are then transmitted to one or both carrier server and the vendor server. In some embodiments, the lock-alarm tokens 128 are provided by the lock-alarm company to only one of the vendor server or the carrier server, and explicitly not to both. After completion of step 236, the method 200 continues to step 240, where one of steps 244 or 248 occur based on the location of the user profile 108.

At step 240, a query can be made to determine if the user profile 108 resides on the vendor server or the shipping carrier server. If the user profile 108 resides on the vendor server, then the method 200 continues to step 244. If the user profile 108 resides on the carrier server, then the method 200 continues to step 248. At step 244, a first data packet that comprises point of delivery WiFi network data, tracking and/or billing numbers, and lock-alarm tokens is created and sent from the vendor server to the carrier server. At step 248, a second data packet that comprises tracking and/or billing numbers, and lock-alarm tokens is created and sent from the vendor server to the carrier server. Other data combinations are possible. Other compositions of data packets are possible. After completion of one of step 244 or step 248, the method 200 continues to step 256.

At step 256, one of either the first data packet (created at step 244) or the second data packet (created at step 248) are communicated to the camera 132 of the delivery agent. Upon arrival to the point of delivery 136, the delivery agent, with use of the camera, enters to within a threshold distance from the WiFi network of the point of delivery 136, and the method 200 continues to step 260.

At step 260 of the method 200, the camera 132 makes a communication connection with the WiFi network of the point of delivery 136. After step 260 is completed, the method 200 continues to step 264 wherein the delivery agent is authenticated and the lock-alarm tokens 128 are employed (i.e. the tokens are transmitted by way of the WiFi network at the point of delivery to enable unlocking/disarming of an entryway into the point of delivery). As discussed above, the authentication of the delivery agent may include one or more sensors types or protocols, to include biometric sensors. After the delivery agent is authenticated at step 264, the method continues to step 268, wherein a recording of the delivery agent is streamed and the entryway into the point of delivery 136 (e.g. the customer user's home) is unlocked/disarmed. After completion of step 268, the method continues to step 272 in which the delivery agent enters the point of delivery 136 and delivers the item(s) and/or performs one or more service(s).

After completion of step 272, the method continues to step 276 wherein the delivery agent exits the point of delivery 136 and the point of delivery is locked and alarmed. After completion of step 276, the method continues to step 280 wherein the customer user 280 is noticed of the completion of the delivery of item(s) and/or execution of service(s) requested. After completion of step 280, the method continues to step 284 wherein recording of the delivery agent by the delivery agent camera 132 and/or by a sensor mounted at the point of delivery (e.g. a camera mounted within the customer user's home and/or mounted at or near the entryway used by the delivery agent) is ended. After completion of step 284, the method 200 ends at step 288.

In another embodiment of a method to provide integrated, secure, and verifiable home services, similar to that of method 200 and with respect to FIGS. 1-2, a first step is to place an order by a customer user. A tracking number is then created and added to an existing customer profile. Next, the order arrives at hub 120, and an out-of-delivery scan 124 occurs. The scan can trigger the collection of home data to the carrier camera. For example, if the home data are stored on a carrier server, the home data are received and stored on the camera (e.g. via WiFi if performed at the hub, or by LTE if the agent is distant). If the home data are stored on a vender server, the home data are received by the carrier server and then by the camera. The delivery agent then arrives at the point of delivery, connects to the home network and to the home lock, and transmits a request for unlock/disarm tokens by way of the home network. The agent is next verified via biometric data and, if a positive identification/verification is made, the agent receives the unlock/disarm tokens via the home network. Recording, with optional streaming, then begins, and the entry, e.g. door, to the home is unlocked/disarmed. Finally, package(s) and/or service(s) are delivered and/or performed, respectively. The agent then departs the home, locks or arms the home, the recording/streaming ends, and notice is provided of the completion of the deliveries and/or services. Note that the agent may rearm or lock the home upon departure in any of several ways, such as by engaging a button of the camera, tapping the camera to an external surface of the home, or simply by traveling past a set threshold (e.g. the porch landing) of the home.

As discussed above, the sequence of steps or elements of FIG. 2 may occur differently, e.g. some steps may be omitted, some steps added, and the steps may follow in other than increasing numerical order. In one embodiment, the step 236 (create unlock/disarm tokens) occurs in coordination with or simultaneously with step 216 (create tracking number), and the sequence of steps after step 228 (scan order as out-for-delivery) is altered. Stated another way, the sequence of initial steps of 204, 208, 212, 216 (as combined with step 236 as discussed immediately above), 220, 224 and 228 are as described above. However, upon the completion of step 228, or as triggered by the start of step 228, the method 200 continues to step 240, as described above, and a query is made as to location of user profile data. As a result of the query of step 240, either of steps 244 or 248 occur, as discussed above.

At the completion of one of steps 244 or 248, the method 200 moves to step 256, wherein a delivery packet set of data are sent or transmitted to the delivery agent's camera. Note that the transfer of the delivery packet data may be defined with any of several characteristics in, e.g., timing geolocation, and means. For example, the delivery packet data may occur by long term evolution (LTE), or any wireless broadband technology, whether 4G or otherwise, while the delivery agent is enroute to the point of delivery, or by wireless upon arrival at the point of delivery. The method 200 then continues to step 260, wherein the agent's camera connects to a network at the point of delivery. Upon connection to the point of delivery network (i.e. step 260), the method continues to step 232, wherein the lock/alarm company is noticed of the communication connection of the agent's camera to the point of delivery network. At the completion of step 232, the method continues to step 264, wherein the delivery agent is authenticated (via biometric sensors, comprising a fingerprint sensor, for example). After step 264, the method continues to step 268 and onwards through the remaining sequence of FIG. 2B (i.e. steps 268, 272, 276, 280, 284, and 288).

In another embodiment, similar to the above method, the unlock/disarm tokens are not generated, and are not provided to the agent's camera, until after the agent's camera connects to the point of delivery communication network, or after the agent biometrics are verified.

In one embodiment, the shipper or carrier maintains and manages the data required for the secure delivery of services or items to a point of delivery. This embodiment is described in more detail with respect to FIGS. 4-5. Generally, the carrier maintains data required for secure identification of the delivery agent (e.g. biometric data), the authentication protocols and data associated with the camera 132, and the required lock-alarm tokens to allow entry to the point of delivery. In such an embodiment, these data (of three distinct types and functions), reside only with the carrier and transfer to other parties (e.g. to vendor 112, to lock-alarm company) is not required, thereby reducing the risk a data breach. A unique identifier for the lock, such as a serial number, can be used in the authentication process. In certain embodiments the unique identifier for the lock can be included in the user profile 108. In some embodiments, the three identifiers comprise the lock identification, the WiFi credentials, and the biometrics of the delivery agent. In such embodiments, the tracking number is synced to the customer profile and enables the above three identifiers to unlock/disarm the entry way (e.g. a door) at the point of delivery (e.g. a residence or a business.)

With attention to FIGS. 3A-C, one embodiment of a camera 132 is depicted. FIGS. 3A-C depict, respectively, a front view, right side view, and rear view of a camera 132. Generally, the camera 132 is comprised of a body 300, a front surface 310, a perimeter surface 320, and a rear surface 330.

A camera 316, comprising a lens 318, is engaged with the front surface 310. A microphone 312 and magnetic connector 314 are engaged or connected with the body 300.

A screen 332 is engaged with or connected to the rear surface 330 of the camera 132. In certain embodiments, screen 332 can comprise a touch interface, such as pressure sensitive touch screens, capacitive touch screens, haptic feedback and the like. Certain embodiments of the camera 132 comprise a user interface displayed on screen 332. The user interface allows a user to provide input to firmware/software stored on camera 132 and allows the user to provide input and/or receive information through the user interface.

The camera 132 also comprises an on/off switch 324 and biometric sensor 322, such as a fingerprint sensor. The camera 132 can comprise an RFID transceiver, a user viewer screen, internal memory storage, WiFi/NFC/Bluetooth capabilities, touch screen capable of receiving user finger signature and/or wireless stylus), and an energy source.

The camera 132 may connect with an attachment device (not shown), such as a collar or arm band, to attach the camera 132 to the user, i.e. the delivery agent. The camera can attach to an attachment device affixed or worn by the user. The attachment device may attach or engage the camera by way of the magnetic connector 314, allowing rapid detachment of the camera from the delivery agent. In one embodiment, upon detachment, the camera remains operating, i.e. the detachment of the camera 132 from the user does not result in a shut-off of the camera. In another embodiment, upon detachment, the camera remains operating for a defined or selectable amount of time, i.e. the detachment of the camera 132 from the user does not result in an immediate shut-off of the camera but rather results in a shut-off after a time lag, e.g. after 5 seconds. In another embodiment the detachment may trigger a notification of detachment sent to the carrier, customer or both, either immediately or after a predetermined amount of time.

In one embodiment, the camera 132 comprises at least one processor chip. In certain embodiments, the camera comprises a plurality of processor chips, e.g. a biometric chip, an identifier or user authentication chip, and a chip that performs all processing by the camera i.e., a main chip. The identifier or user authentication chip, and/or the biometric chip, may comprise encryption technology and/or tamper-proof features. Certain embodiments comprise a main chip that performs all processing performed by camera 132 except biometric processing and identifier or authentication processing. In certain embodiments, the camera 132 connects to the point of delivery 136 (such as the home 104 of a user) using wireless protocols including WiFi, NFC, Bluetooth, RFID and other wireless connection protocols. The camera 132 can be configured receive information regarding the user profile 108 from any number of locations, to include vendor's site, delivery agent's site, and cloud-based site(s) when connected at the point of delivery 136. The information can include preferences that are associated with multiple parties associated with a particular point of delivery 136. For example, the user profile might provide that for a first customer user 104, packages are to only be delivered to a designated area in the home's foyer, and for a second customer user 104', user packages are to be delivered to a designated home office.

Figure 4:
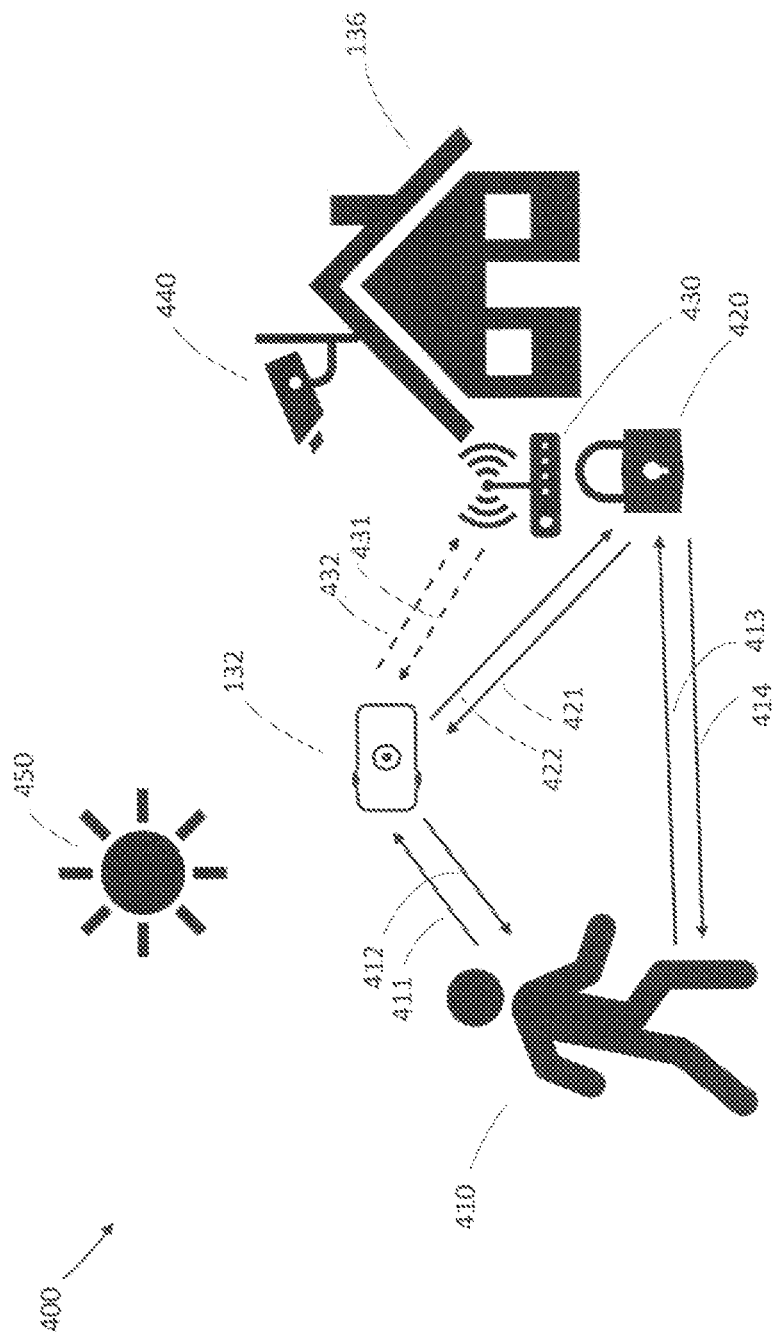
FIG. 4 is a schematic diagram of another embodiment of a system to provide integrated, secure, and verifiable home services.

FIGS. 4 and 5 describe an alternate embodiment of a system 400 and method 500 to provide integrated, secure, and verifiable home services. FIG. 4 is a schematic diagram of such a system 400 and FIG. 5 is a companion method of operation 500 of the system 400. Generally, the system 400 and method 500 reduces the transfer and access to data required for the secure delivery of services or items to a point of delivery by having the delivery carrier 410 maintain and manage the data required for the secure delivery of services or items to a point of delivery 136. In the description below, the system 400 and the method 500 will be referenced interchangeably to refer to the same embodiment for integrated, secure, and verifiable home services. Also, the system 400 is like the system 100 of FIG. 1, and as such, reference will be made to FIG. 1 and to the above description of FIG. 1 to include reference to element numbers provided on FIG. 1. Like the method 200 of FIGS. 2A-B, the elements or steps of method 500 may occur in a different order, some elements or steps may be combined or deleted, and additional elements or steps may be added.

Generally, the system 400 includes delivery carrier 410, camera 132, and customer user's 104 specific lock 420 located at the point of delivery 136. This trinity of components—the delivery carrier 410, camera 132, and lock 420 enable the execution of the method 500 of integrated, secure, and verifiable home services. Furthermore, the tracking number 450 is depicted as an overarching component of the system 400, in that the tracking number 450 is the customer authorized purpose for the delivery agent to have access to the home. Absent a tracking number associated with a customer requested service or delivery, then having the lock, WiFi, and biometrics should not open the door. The WiFi and the lock data are the equivalent of the "hide a key" and the biometrics are the proof of identity. Stated another way, the collection of the lock data, WiFi data, and biometric data do not merit reason to enter the premises; only the tracking number provides such a reason and thus authority.

Communication occurs between the trinity components, as shown in FIG. 4, and with the WiFi network 430 located at the point of delivery 136. Here, communication is defined broadly to include electronic communication (e.g. via WiFi or other networks, via sharing of access to particular data of a system 400 element, etc.) and physical communications (e.g. via physical interaction between components, such as the delivery agent 410 providing a touch input to the screen 332 or biometric sensor 322 of the camera 132). Specifically, the delivery agent 410 outputs or transmits communication outputs 411 and 413 to camera 132 and lock 413, respectively, and receives communication inputs 412 and 414 from camera 132 and lock 414, respectively. Also, lock 420 outputs or transmits communication outputs 414 and 421 to delivery agent 410 and camera 132, respectively, and receives communication inputs 413 and 422 from delivery agent 410 and camera 132, respectively. Further, camera 132 outputs or transmits communication outputs 412 and 422 to the delivery carrier 410 and lock 420, respectively, and receives communication inputs 411 and 421 from the delivery carrier 410 and lock 420, respectively.

For simplicity and clarity, not all communication paths are depicted in FIG. 4. Additional or fewer communication links are possible. For example, the WiFi network 430 may communicate directly with the lock 420, with the delivery carrier 410, and point of delivery exterior camera 440. As a specific example, as shown in FIG. 4, and the communication network 430 may be a WiFi network and may communicate with the camera 132 by way of WiFi output communication 431 and WiFi input communication 432.

With particular attention to FIG. 5, a flowchart of a method 500 to provide integrated, secure, and verifiable home services is provided, the method 500 utilizing the elements described in the system 400 of FIG. 4. Also, the method 500 is like the method 200 of FIG. 2A-B and system 100 of FIG. 1, and as such, reference will be made to FIGS. 1 and 2A-B, and to the above description of FIGS. 1 and 2A-B to include reference to element numbers provided on FIGS. 1 and 2A-B.

The method 500 starts at step 504 and ends at step 588. Any of the steps, functions, and operations discussed herein can be performed continuously and automatically. In some embodiments, one or more of the steps of the method 500 may comprise computer control, use of computer processors, and/or some level of automation. The steps are notionally followed in increasing numerical sequence, although, in some embodiments, some steps may be omitted, some steps added, and the steps may follow other than increasing numerical order.

After starting at step 504, an order is received by the system 400 at step 512. The step 512 is similar to the place order step 212 of method 200. A customer user 104 may place an order for delivery of one or more goods and/or services. For example, a customer may order a quad-copter aerial drone "good" for delivery, and also order two services: assembly of the drone, and placement of the assembled drone within a locked closet within the home (so as to prevent unauthorized or premature use). In some embodiments, if the customer user 104 is a new customer or is an existing customer without a customer profile, the customer user 104 would create a customer profile in coordination with the step 512 to placing an order. After completion of step 512, the method 500 continues to step 516.

At step 516, one or more tracking numbers are created. The step 516 is similar to the step 216 of method 200. In one embodiment, a unique tracking number is provided for each good, or batch of goods, and for each service. For example, continuing the example involving the drone order, one tracking number may be generated for the delivery of the drone good, another tracking number for the execution of the service of assembling the drone, and yet another tracking number for the execution of the service of securing the drone within a locked closet within the home point of delivery. After completion of step 516, the method 500 continues to step 518.

At step 518, the customer profile data is accessed. The customer profile data may be stored in a user profile database 108 similar to that described with respect to method 200 and FIGS. 2A-B. The customer profile data may comprise delivery point network access data and delivery point lock-alarm data. Each of the delivery point network access data and delivery point lock-alarm data may be associated with the delivery point. For example, the delivery point network access data may comprise WiFi network name and password, or any other set of data required to access a communication network 430 disposed at the delivery point 136. As another example, the delivery point lock-alarm data may comprise codewords or required alphanumeric sequencing require to switch the lock-alarm 420 between an activated or armed start and a deactivated or disarmed state. The delivery point lock-alarm data may be transmitted by way of the communication network 420. In one embodiment, one or both of the delivery point network access data and delivery point lock-alarm data are communicated to, received by, and/or stored by the camera 132. In another embodiment, one or both of the delivery point network access data and delivery point lock-alarm data are communicated to, received by, and/or stored in a location other than the camera 132, such as a remote cloud-based server. In one embodiment, a customer order receiver of the camera 132 (also referred to as a customer delivery request receiver of the camera 132) receives and stores the delivery point network access data and delivery point lock-alarm data.

One or both of the delivery point network access data and delivery point lock-alarm data may be encrypted or employ authentication protocols known to those skilled in the art. The delivery point network access data and the delivery point lock-alarm data may be bundled into a data packet. The delivery point network access data and/or delivery point lock-alarm data may be termed authentication tokens, as described above regarding FIGS. 1 and 2A-B. One or both of the delivery point network access data and the delivery point lock-alarm data may be time-limited, meaning that the validity of the data expires after a set amount of time has passed since transmission. After completion of step 518, the method 500 continues to step 520.

At step 520, the item is shipped. Step 520 is similar to step 220 and step 228 of method 200. In the event that a service item is ordered, and that service item is to be performed by someone other than the delivery agent 410 with mounted camera 132, at step 520 the other party is noticed. Stated another way, any third parties required to perform a service at the point of delivery are noticed in step 520 of the terms and conditions of the service. In the drone example provided, a third party required to perform the construction of the drone good (the drone good being delivered by the delivery agent) is noticed at step 520 of the need to construct the drone, arrive at a set time, and the address of the delivery point. In one embodiment, the step 520 triggers authorization for the delivery agent to receive delivery data at the point of delivery. Such authorization may be limited in any of several ways, to include time limited (e.g. the authorization expires after four hours) or geographically limited (the authorization is limited to a set of zip codes.) After the completion of step 520, the method continues to step 529.

In one embodiment, prior to shipment of the items, or in concert with shipment of the items, the method 500 accesses delivery agent biometric data. More specifically, the camera 132 receives per delivery person biometric authentication data, to be used to authenticate a particular delivery person (delivery agent) to employ or access the delivery point network access data and delivery point lock-alarm data at the point of delivery. In one example, the biometric authorization data may comprise per delivery agent fingerprint data, cardiac data (such as heart profile, blood pressure profile, etc.), and any other human identification metrics known to those skilled in the art. In one embodiment, the per agent biometric data are time-limited. The per delivery agent biometric data may be combined with one or both of the delivery point network access data and the delivery point lock-alarm data into a data packet.

At step 529, the delivery agent arrives at the delivery site. Upon arrival at the delivery site, one or more events or steps may occur simultaneously or in rapid succession, i.e. one or more of the steps of 556, 560, and 564. For example, upon arrival at the delivery site (as determined, for example, by monitoring position of the GPS-enabled camera worn by the delivery agent), delivery data may be transmitted to the agent. In one embodiment after validating the delivery agent's biometric data. Such delivery data may include one or more of the delivery point network access data, the delivery point lock-alarm data, the delivery agent specific biometric data, and the tracking number. (In one embodiment, the tracking number may collectively refer to a bundle of data, such as the bundle of the delivery point network access data, the delivery point lock-alarm data, and the delivery agent specific biometric data.) In one embodiment, the tracking number bundled data is time-limited or time-constrained, meaning the tracking number bundled data is only valid for a set amount of time or only valid during set blocks of time. For example, the tracking number bundled data may only be valid from 12 noon-5 pm on Day 1, then from 6 am-1 pm on Day 2, then otherwise invalid. Such time windows may be established based on when the tracking number was created or when the delivery scan occurred, e.g. the Day 1 validity is from +1 hour from delivery scan to +6 hours from delivery scan. Other restrictions on the validity of the tracking number bundled data (or the individual data sets, e.g. the delivery point lock-alarm data, may be established. For example, the delivery point lock-alarm data may only be authorized or valid after a positive verification of the agent's identity is performed by way of a biometric identification using the delivery agent specific biometric data and the agent camera.

In one embodiment, a defined failure of one or more of the validity checks of the tracking number bundled data results in blocking or invalidity of the entire set of tracking number bundled data. Such an invalidity decision may be permanent or temporally limited (e.g. the invalidity is only for the remainder of that day, then the tracking number bundled data is valid the next day.) Other validity triggers are possible, e.g. upon completion of a delivery, the tracking number bundled data is marked as delivered or completed and thus invalidated. In one embodiment, unless all of the: 1) delivery point network access data, 2) the delivery point lock-alarm data, and 3) the biometric data are authenticated, the set of tracking number bundled data are all deemed invalid. In one embodiment, the failure to authenticate one of more of the afore-identified data results in a time-limited suspension of the validity of the tracking number bundled data set.

At step 556, the required delivery data is received by the camera 132 and loaded onto the camera 132. The required delivery data comprises the delivery point network access data, the delivery point lock-alarm data, and the delivery agent specific biometric data. The required delivery data (as described above) may be bundled into one or more blocks of data and may in some embodiments include association with the tracking number. Furthermore, the required delivery data may be encrypted by any means known to those skilled in the art, may be temporally limited, and may be configured for quality control (QC) verifications. For example, the camera 132 may not load the required data if the camera biometric sensor determines that the camera is being worn by a user other than the authorized user. After the completion of step 556, the method continues to step 520.

At step 560, the delivery agent 410, having arrived at the delivery point 136, connects to the communication network 430, as enabled by the delivery point network access data loaded on and transmitted from the camera 132. Stated another way, the camera 132 transmits the required delivery point network access data (e.g. user name, password, any other data e.g. encryption keys) to the communication network 430, so as to establish a communication link. Step 560 is similar to step 260 of method 200 of FIGS. 2A-B. In one embodiment, the communication link between the camera 132 and the communication network 430, the communication network disposed at or near the delivery point 136, may established an interim communication with the camera 132, and require an additional validation check for full or non-interim communications. The additional verification step may require input from the delivery agent 410, such as a biometric check of the identity of the delivery agent 410. Upon establishment of a connection between the camera and the communication network 430, the camera 132 may begin recording (e.g. video recording, location tracking via GPS sensor within camera, etc.) and may broadcast the recording to any of several entities, such as the customer user 104 or the delivery company. Alternately, the camera 132 may simply record data from a video and/or still camera element of the camera without broadcast or further communication. In one embodiment, the camera broadcasts the video feed to the point of delivery for recording. After the completion of step 560, the method continues to step 564.

At step 564, the delivery agent 410 is authenticated (if not already authenticated in step 560 or otherwise) and the delivery data is assessed. Step 564 is similar to step 264 of method 200. The delivery agent 410 may be authenticated in any number of ways, to include by way of one or biometric sensors 322 of the camera 132. For example, the delivery agent 410 may be notices by way of the screen 332 of camera 132 to press a finger against a fingerprint biometric sensor 322 to enable biometric identification of the delivery agent 410 by comparison with biometric data stored on the camera 132. Other biometric sensors or metrics are possible such as cardiovascular measures (heartbeat frequency spectrum analysis, any biometric means known to those skilled in the art). The delivery data accessed by the camera 132 at step 564 comprises the delivery point lock-alarm data. After the completion of step 564, the method continues to step 568.

At step 568, after verifying the delivery agent's biometrics data and connection to the home network and lock, the lock 420 disposed adjacent or on the delivery point 136 is disarmed or deactivated with transmittal of the delivery point lock-alarm data from the camera 132 to the lock 420. In some embodiments, the package(s) for delivery may be scanned at the point of delivery. In some embodiments, a communication is sent to one or more parties to notice of the event of lock disarming. For example, the customer user 104 may be noticed of the lock disarm, or the alarm company associated with the lock may be noticed. In one embodiment, the act of unlocking the lock triggers a timer wherein the delivery point alarm will trigger if the timer time limit is exceeded.

The recording and/or transmittal of delivery characteristics may take any of several forms. For example, the system 500 may record video, by way of the camera, agent activity at the point of delivery, and/or may record timestamps associated with agent entry to and exit from the point of delivery. The system 500 may transmit all or some of these data to the customer user or another designated party. In another example, the system 500 may solely record and transmit time stamps associated with agent entry to and exit from the point of delivery. This later example may result in a less-expensive embodiment for the customer user.

In one embodiment, the delivery point lock-alarm data includes data that defines geometric boundaries within the point of delivery that are authorized. That is, the delivery point lock-alarm data defines authorized and unauthorized zones for delivery agent activity—if the delivery agent enters an unauthorized zone, an action may be taken, such as sounding an alarm, contacting the delivery office, contacting a security service or contacting police. Returning to the drone delivery example, the delivery point lock-alarm data may authorize the delivery agent to access the front foyer of the home and a formerly-locked closet, where the constricted drone is to be stored. Also, the delivery point lock-alarm data may include data indicating parameters of any services to be performed in parallel or in coordination with the delivery of goods by the delivery agent 410. Regarding the drone example, the delivery point lock-alarm data may indicate that a second agent will enter the home (to assemble the drone), such that any interior home surveillance is configured to expect two persons in the home, and therefore not incorrectly trigger an alarm if surveillance motion detectors identify two persons in the home. After the completion of step 568, the method continues to step 572.

At step 572, the one or more goods are delivered, and the one or more services are performed. Step 572 is similar to step 272 of method 200 of FIGS. 2A-B. After the completion of step 572, the method continues to step 576.

At step 576, the delivery agent(s) exit the point of delivery 136 and the key 420 of the point of delivery 136 is armed or locked. The step 576 is similar to the step 276 of method 200. In one embodiment, the key 420 is automatically armed or locked upon the delivery agent passing a given physical threshold location at the point of delivery. For example, the key 420 may automatically arm or lock when the delivery agent passes over wired perimeter surrounding the landing of the front door of a home or may arm or lock upon triggering by a button on camera. After the completion of step 576, the method continues to step 580.

At step 580, the customer user is noticed of the completion of the one or more delivery requirements ordered. The step 580 is similar to the step 280 of method 200. The customer user may be noticed of details of the delivery requirements beyond a binary completion status. For example, returning to the drone example, the customer may be noticed that the good (the drone) was delivered and one service item (placement of constructed drone into closet) was completed, while another service item (construction of the drone) was partially completed (one of the light beacons on one of the four rotors was missing from the drone kit.) After the completion of step 580, the method continues to step 584.

At step 584, the video recording by the camera 132 is stopped, and the tracking number becomes invalid. Step 584 is similar to step 280 of method 200. After the completion of step 584, the method continues to step 588 and the method ends.

In certain embodiments, the camera 132 when, connected to the point of delivery 136 is configured to receive and process data comprising data contained in the user profile 108, such as a first set of data (e.g. a first WiFi password or first protocol for entry to a first point of delivery 136, such as the primary residence of a customer user 104) and/or a second set of data (e.g. a second WiFi password or second protocol for entry to a second point of delivery 136'). In some embodiments, the wireless components (WiFi, NFC, Bluetooth, RFID and the like) of camera 132 can be configured to receive data from the user profile 108, where the user profile 108 can comprise multiple user profiles and multiple points of delivery.

In one embodiment, the camera 132 is configured to be worn by a user near, adjacent, or substantially over the user's heart, and may receive or monitor the user's cardiac activity (e.g. monitor heart rate).

In another embodiment of a method to provide integrated, secure, and verifiable home services, the following steps are performed (although, as with other methods described in this disclosure, some steps may be added or deleted, and the sequence of the steps may be changed):

1. Customer creates profile with the carrier that includes lock identification data, alarm codes (if applicable) and WiFi network login data
   a. If created with vendor, vendor makes profile accessible to carrier
2. Customer places an order that is delivered by a participating carrier
3. The shipment is created in the carrier system
4. The tracking number for the shipment is added to the customer profile's "shipments in process" or active shipments said differently
5. The order arrives at the local delivery hub
6. The order is scanned as out for delivery
   a. This triggers the downloading of a packet of info including/linked to the tracking number to the delivery agent's camera. The packet has, WiFi, lock & alarm. Collectively, this is the Delivery Data
7. The out for delivery scan begins the delivery window
8. Delivery agent arrives at the point of delivery
9. Delivery scan is performed via the camera
10. The scan activates the delivery data and the camera connects to the lock and home network
11. The agent is validated by way of biometric data
   a. If tokens are to be sent, the validation by the agent triggers token transmission
12. Camera begins recording, whether video or timestamp
13. Unlock/Disarm occurs
14. Delivery and/or service performed
15. Exit home and press lock/arm button on camera
   a. Door locks. Alarm arms.
16. End recording
17. Delivery complete notice sent to carrier and to customer
18. Tracking number no longer able to be used to gain entry to home If for any reason the delivery is not able to be performed during the standard delivery hours, or the customer's approved delivery hours, then the tracking number is paused until the following day when a new out for delivery scan occurs. Here the word paused means unable to be used to open up the home.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The exemplary systems and methods of this disclosure have been described in relation to construction, viewing and/or recording of environments. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system to provide secure delivery of a good to a delivery point, comprising:
    a database of user profile data, the user profile data comprising user profile delivery point network access data and user profile delivery point lock-alarm data, each of the user profile delivery point network access data and the user profile delivery point lock-alarm data associated with the delivery point;
    a customer order receiver, using a processor, operating to: receive a customer order by a customer user that includes delivery by a delivery service of the good, and generate a system tracking number in response to receiving an authorization from the customer user to deliver the good to the delivery point;
    a lock-alarm system associated with the delivery point, the lock-alarm system operating in at least an activated mode and a deactivated mode;
    a wireless device associated with a delivery agent and operating to interact with the system tracking number and to communicate with a communication network of the delivery point; wherein:
        upon scanning the system tracking number at the delivery point, an identity of the delivery agent is verified using delivery service agent authorization data;
        upon verifying the identity of the delivery agent, using the system tracking number to enable: i) the transfer of the user profile delivery point network access data and the user profile delivery point lock-alarm data from the user profile to the wireless device, and ii) the use of the user profile delivery point network access data to connect the wireless device to the communication network of the delivery point;
        upon connecting the wireless device to the communication network: i) activating a video capture function of the wireless device, and ii) changing the lock-alarm system from the activated mode to the deactivated mode; and
        the good is delivered to the delivery point.

2. The system of claim 1, wherein data associated with the system tracking number includes: i) video data, and ii) is updated upon delivery of the at least one item to the delivery point.

3. The system of claim 1, wherein video captured by the wireless device is broadcast.

4. The system of claim 1, wherein the delivery agent is one of a human and an automated ground vehicle.

5. The system of claim 1, wherein the wireless device comprises a biometric sensor configured to verify the identity of the delivery agent.

6. The system of claim 1, wherein at least one of a validity of the user profile delivery point network access data and a validity of the user profile delivery point lock-alarm data is at least one of: i) invalidated after a selectable time period, and ii) invalidated upon delivery of the good to the delivery point.

7. The system of claim 1, wherein the identity of the delivery agent is determined by use of data transfer between the delivery agent and the lock-alarm system.

8. A secure delivery method of at least one item to a delivery point, comprising:
    placing an order by a customer user to deliver the at least one item to the delivery point, the customer user having a customer user profile comprising customer user profile delivery point network access data and customer user profile delivery point lock-alarm data;
    identifying an authorization from the customer user to deliver the at least one item to the delivery point, the delivery point comprising a lock-alarm system, the lock-alarm system: i) operating in at least an activated mode and a deactivated mode; and ii) engaging with a delivery point communication network;
    in response to receiving the order, identifying the authorization as a positive authorization, generating a system tracking number;
    positioning a wireless device of a delivery service agent of a delivery service proximal to the delivery point, the delivery service agent having delivery service agent authentication data;
    upon scanning the system tracking number at the delivery point, verifying an authenticity of the delivery service agent using: i) the system tracking number, and ii) the delivery service agent authentication data;

upon verifying the authenticity of the delivery service agent: i) connecting the wireless device to the delivery point communication network using the customer user profile delivery point network access data; ii) activating a video recording function of the wireless device to create video data; and iii) changing the lock-alarm system from the activated mode to the deactivated mode using the customer user profile delivery point lock-alarm data;

the at least one item is delivered to the delivery point;

the system tracking number is updated to include the video data; and the lock-alarm system is changed from the deactivated mode to the activated mode.

9. The method of claim 8, further comprising the step of: upon verifying the authenticity of the delivery service agent and before connecting the wireless device to the delivery communication network, alerting the lock-alarm system of a positive authenticity of the delivery service agent.

10. The method of claim 8, further comprising the step of transferring the customer user profile delivery point network access data and the customer user profile delivery point lock-alarm data to the wireless device.

11. The method of claim 8, further comprising, upon verifying the authenticity of the delivery service agent, communicating with a home security system associated with the delivery point.

12. The method of claim 8, wherein the delivery agent is one of a human and an automated ground vehicle.

13. The method of claim 8, wherein: video captured by the wireless device is broadcast; and the wireless device comprises a biometric sensor configured to verify an identity of the delivery agent.

14. The method of claim 8, further comprising the step of the delivery service agent performing an activity at or adjacent to the delivery point, the activity other than delivery of an item.

15. A secure delivery system to deliver an item to a delivery point, comprising:

a customer order receiver, using a processor, operating to:
a) receive a customer order by a customer user that includes delivery by a delivery service of the item, and
b) generate a system tracking number in response to accessing a positive authorization from the customer user to deliver the item to the delivery point, the customer user having a customer user profile comprising customer user profile delivery point network access data and customer user profile delivery point lock-alarm data;

a lock-alarm system associated with the delivery point, the lock-alarm system: i) operating in at least an activated mode and a deactivated mode; and ii) engaging with a delivery point communication network; and a wireless device associated with a delivery agent, the wireless device configured to communicate with the lock-alarm system, the delivery service agent having delivery service agent authentication data; wherein:

the wireless device is positioned proximal to the lock-alarm system;

upon scanning the system tracking number at the delivery point, verifying an authenticity of the delivery service agent using: i) the system tracking number, and ii) the delivery service agent authentication data;

upon verifying the authenticity of the delivery service agent: i) connecting the wireless device to the delivery communication network using the customer user profile delivery point network access data; ii) activating a video recording function of the wireless device to create video data; and iii) changing the lock-alarm system from the activated mode to the deactivated mode using the customer user profile delivery point lock-alarm data;

the item is delivered to the delivery point;

the system tracking number is updated to include the video data; and the lock-alarm system is changed from the deactivated mode to the activated mode.

16. The secure delivery system of claim 15, wherein the verifying the authenticity of the delivery service agent comprises data transfer between the delivery agent and the lock-alarm system.

17. The secure delivery system of claim 15, wherein the delivery agent is one of a human and an automated ground vehicle.

18. The secure delivery system of claim 15, wherein video captured by the wireless device is broadcast.

19. The secure delivery system of claim 15, wherein the wireless device comprises a biometric sensor configured to verify an identity of the delivery agent.

20. The secure delivery system of claim 15, wherein both the customer user profile delivery point network access data and the customer user profile delivery point lock-alarm data are transferred to the wireless device.

* * * * *